United States Patent
Tashiro

(10) Patent No.: US 7,927,489 B2
(45) Date of Patent: Apr. 19, 2011

(54) MAGNET SEPARATOR

(75) Inventor: Minoru Tashiro, Tokyo (JP)

(73) Assignee: Bunri Incorporation, Miyazaki (JP)

( * ) Notice: Subject to any disclaimer, the term of this patent is extended or adjusted under 35 U.S.C. 154(b) by 0 days.

(21) Appl. No.: 12/830,666

(22) Filed: Jul. 6, 2010

(65) Prior Publication Data

US 2010/0270224 A1    Oct. 28, 2010

Related U.S. Application Data

(63) Continuation of application No. PCT/JP2009/052065, filed on Feb. 6, 2009.

(30) Foreign Application Priority Data

Feb. 8, 2008 (JP) .................... 2008-029703

(51) Int. Cl.
  *B01D 35/06*    (2006.01)
  *B03C 1/14*    (2006.01)
(52) U.S. Cl. ...... 210/222; 210/396; 210/102; 209/223.2
(58) Field of Classification Search .......... 210/222, 210/396, 402; 209/223.2
  See application file for complete search history.

(56) References Cited

U.S. PATENT DOCUMENTS

2007/0187302 A1*  8/2007  Parra Huerta ............... 210/222

FOREIGN PATENT DOCUMENTS

| JP | 3024673 U | 3/1996 |
| JP | 2000-79353 A | 3/2000 |
| JP | 2001-29838 A | 2/2001 |
| JP | 2005-175377 A | 6/2005 |
| JP | 2007-978 A | 1/2007 |
| JP | 2008-18319 A | 1/2008 |
| WO | 2007/072608 A1 | 6/2007 |
| WO | 2007/138891 A1 | 12/2007 |

OTHER PUBLICATIONS

English Tranlation of the Written Opinion for JP/2009/052065, undated.*
International Search Report in PCT/JP2009/052065, Mar. 3, 2009.

* cited by examiner

*Primary Examiner* — David A Reifsnyder
(74) *Attorney, Agent, or Firm* — Bacon & Thomas, PLLC

(57) ABSTRACT

A magnet drum mechanism of a magnet separator includes a cylindrical drum, a magnet provided inside of the drum and forming a magnetic field region configured to adsorb magnetic particles in a circumferentially partial range of an outer peripheral surface of the drum, and a scraper provided in a nonmagnetic field region of the drum, the scraper being configured to guide the magnetic particles adsorbed onto the outer peripheral surface of the drum to an outside of the separator main body in the nonmagnetic field region. The scraper includes a front end portion which faces the outer peripheral surface of the drum in a contactless manner along an axial direction of the drum, and a small gap is formed between the front end portion and the outer peripheral surface of the drum.

2 Claims, 4 Drawing Sheets

MAGNET SEPARATOR

CROSS REFERENCE TO RELATED APPLICATIONS

This is a Continuation Application of PCT Application No. PCT/JP2009/052065, filed Feb. 6, 2009, which was published under PCT Article 21(2) in Japanese.

This application is based upon and claims the benefit of priority from prior Japanese Patent Application No. 2008-029703, filed Feb. 8, 2008, the entire contents of which are incorporated herein by reference.

BACKGROUND OF THE INVENTION

1. Field of the Invention

The present invention relates to a magnet separator which separates and removes magnetic particles from a liquid to be processed.

2. Description of the Related Art

In machine processing, a large amount of coolant is used for cooling and lubrication. During processing, magnetic particles, such as chips and grinding dust, are mixed into the coolant. The mixed magnetic particles form sludge in the coolant. The coolant is repeatedly used by separating and removing the sludge after use.

Japanese Utility Model No. 3024673 discloses a magnet separator which captures sludge in a coolant, and discharges it. The separator comprises a cylindrical drum and a magnet provided inside of the cylindrical drum. The sludge is adsorbed onto an outer peripheral surface of the magnet drum by magnetic force of the magnet. The separator is provided with a squeeze roll which squeezes out a liquid contained in the sludge, and a scraper (sludge removal plate) which scrapes off the sludge out of which liquid has been squeezed from the outer peripheral surface of the drum.

The scraper described in the above-mentioned Japanese Utility Model No. 3024673 is pressed on the outer peripheral surface of the drum. Namely, a front end portion of the scraper is brought into intimate contact with the outer peripheral surface of the drum so as not to leave sludge adsorbed onto the outer peripheral surface of the drum.

When processing an oily coolant, an oil film is formed on the outer peripheral surface of the drum. When the amount of sludge is relatively large, the oil film is returned to a liquid storage part of a separator main body by an action of the squeeze roll. However, when machining is not performed, or when the amount of sludge is relatively small during machining, the oil film is not sufficiently removed by the action of the squeeze roll, and most of the oil film remains on the outer peripheral surface of the drum. The oil film is scraped off by the scraper, and flows into a sludge box. Accordingly, use of a scraper as described above causes loss of a liquid to be processed (i.e., a phenomenon in which the amount of a liquid to be processed decreases).

As measures to prevent the loss, enhancing the squeeze efficiency by, for example, increasing hardness of the squeeze roll or pressing the squeeze roll more hardly on the drum is considered. However, those measures require mechanical upgrading, which involves a substantial increase in costs. On the other hand, the measures produce only a limited effect, and are not drastic.

BRIEF SUMMARY OF THE INVENTION

An object of the present invention is to provide a magnetic separator which can suppress loss of a liquid to be processed.

A magnet separator according to one embodiment of the present invention comprises: a separator main body comprising a liquid storage part which stores a liquid to be processed containing magnetic particles; and a magnet drum mechanism provided in the separator main body. The magnet drum mechanism comprises: a cylindrical drum which rotates around a horizontal axis and comprises an upper portion above a surface of the liquid; a magnet provided inside of the drum, facing an inner peripheral surface of the drum, and fixed to the separator main body in such a manner that the magnet is stationary when the drum is rotating, the magnet forming a magnetic field region configured to adsorb the magnetic particles in a circumferentially partial range of an outer peripheral surface of the drum; a liquid passage portion which is formed on a bottom side of the outer peripheral surface of the drum and through which the liquid passes; and a scraper provided in a nonmagnetic field region formed on the upper portion of the drum at a position separated from the magnetic field region in the circumferential direction, the scraper being configured to guide the magnetic particles adsorbed onto the outer peripheral surface of the drum to an outside of the separator main body in the nonmagnetic field region. The scraper comprises a front end portion which faces the outer peripheral surface of the drum in a contactless manner along an axial direction of the drum, and a small gap is formed between the front end portion and the outer peripheral surface of the drum.

According to the present invention, loss of the liquid to be processed can be suppressed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
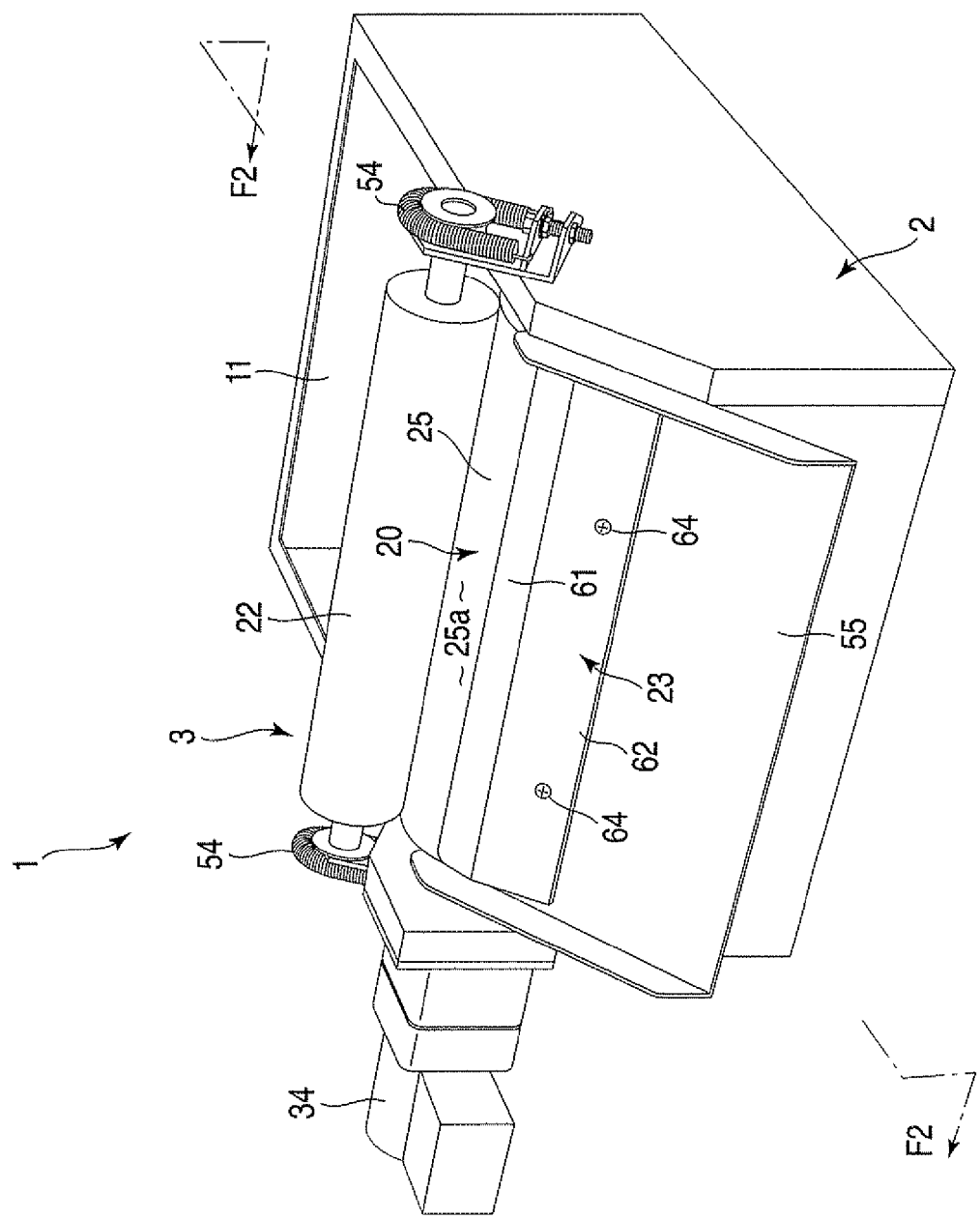
FIG. 1 is a perspective view showing a separator according to one embodiment of the present invention.

Hereinafter, an embodiment of the present invention will be described based on the drawings. FIG. 1 is an overall view of a magnet separator 1 (hereinafter simply referred to as separator 1) according to the present embodiment. The separator 1 is a device which separates sludge from a coolant after use for a machine tool such as a grinding machine (so-called contaminated liquid).

The "sludge" herein refers to a mass of magnetic particles mixed with a coolant and brought into a polluted mud-like state. The magnetic particles are particles having a property of being attracted by magnetic force, and are, for example, cuttings, chips, and grinding dust of a metal. The contaminated liquid including the sludge (i.e., magnetic sludge) is an example of the liquid to be processed of the present invention.

Figure 2:
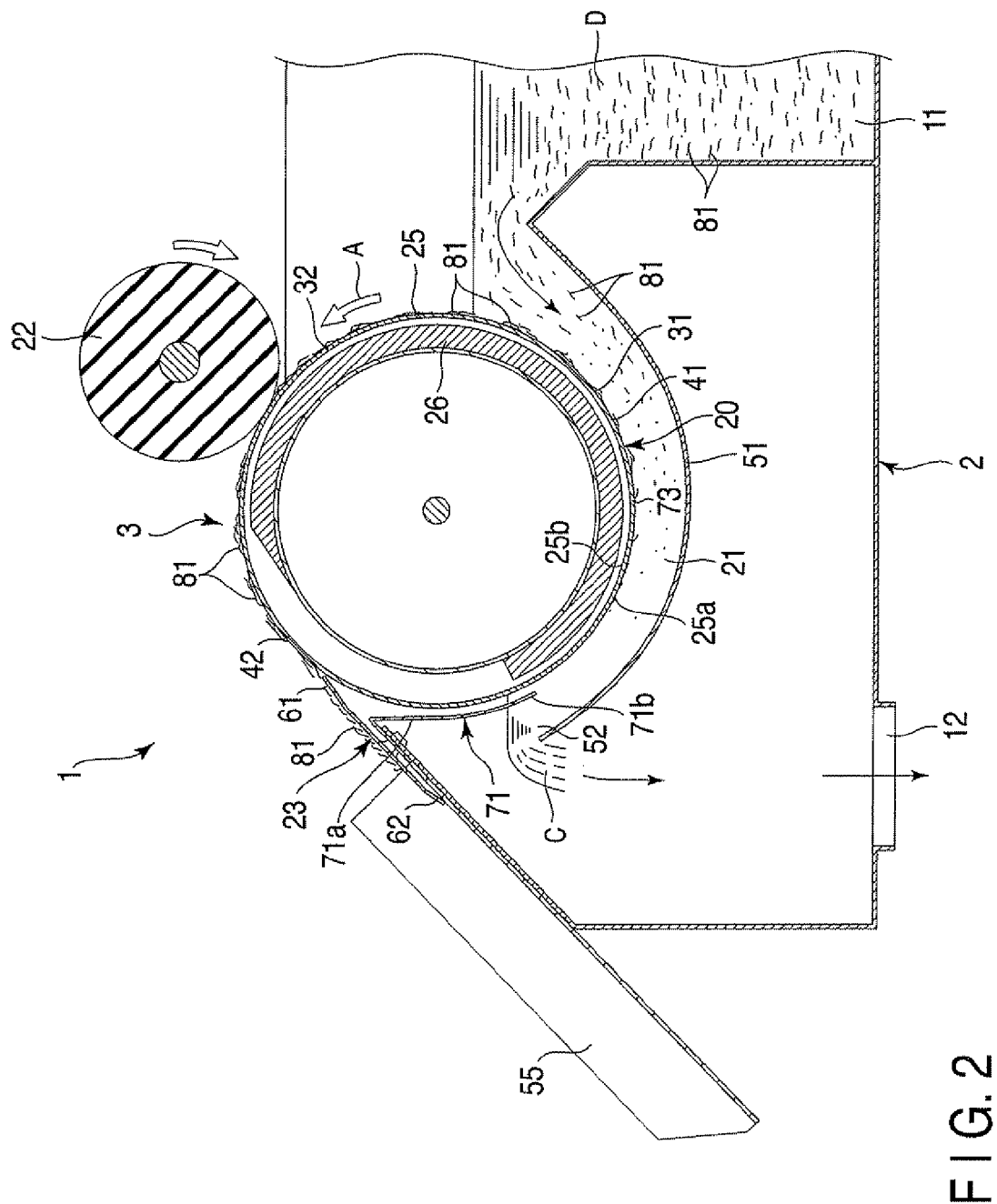
FIG. 2 is a cross-sectional view of the separator shown in FIG. 1 taken along line F2-F2.

As shown in FIG. 1, the separator 1 comprises a separator main body 2 and a magnet drum mechanism 3. The separator main body 2 comprises a liquid storage part 11 which stores a contaminated liquid D (see FIG. 2), and temporarily stores the contaminated liquid D. As shown in FIG. 2, the separator main body 2 is provided with an outlet 12.

The outlet 12 faces a clean tank (not shown), and discharges a coolant from which sludge 81 has been filtered out by the magnet drum mechanism 3 (so-called cleaned liquid C) to the clean tank.

As shown in FIG. 2, the magnet drum mechanism 3 is provided in the separator main body 2. The magnet drum mechanism 3 comprises a magnet drum 20, a liquid passage portion 21, a squeeze roll 22, and a scraper 23. The magnet drum 20 comprises a drum 25 and a magnet 26.

As shown in FIG. 1, the drum 25 is shaped like a cylinder having a horizontal axis. As shown in FIG. 2, the drum 25 is provided in the separator main body 2 in such a manner that, for example, a lower portion 31 is immersed in the contaminated liquid D and an upper portion 32 is above a liquid surface of the contaminated liquid D. The drum 25 is rotated around the axis in direction A shown in FIG. 2 by a drive motor 34 (see FIG. 1). An example of the drum 25 is made of a nonmagnetic material such as stainless steel. However, the material may be metallic and nonmetallic.

As shown in FIG. 2, the magnet 26 is disposed on the inside of the drum 25 and faces an inner peripheral surface 25b of the drum 25. The magnet 26 is fixed to the separator main body 2, and stationary even when the drum 25 is rotating. As shown in FIG. 2, the magnet 26 is provided in such a manner as to correspond to part of the circumference of the drum 25. Accordingly, the magnet 26 forms a magnetic field region 41 that can adsorb magnetic particles 81a in a circumferentially partial range of an outer peripheral surface 25a of the drum 25.

The magnetic field region 41 is, for example, an area facing the magnet 26, and is an area which is relatively strongly influenced by a magnetic field of the magnet 26. As shown in FIG. 2, the magnetic field region 41 is formed, for example, from a lower area of the drum 25 immersed in the contaminated liquid D to part of an upper area of the drum which faces the squeeze roll 22.

On the outer peripheral surface 25a of the drum 25, a nonmagnetic field region 42 is formed on the upper portion 32 of the drum 25 at a position separated from the magnetic field region 41 in the circumferential direction. The nonmagnetic field region 42 is, for example, an area which does not face the magnet 26, and is an area which is barely influenced by the magnetic field of the magnet 26, or less influenced by the magnetic field of the magnet 26 than the magnetic field region 41. As shown in FIG. 2, the nonmagnetic field region 42 is formed in an area facing the scraper 23.

As shown in FIG. 2, a bottom plate 51 is provided in the separator 1. The bottom plate 51 forms part of a partition wall of the liquid storage part 11, and is provided along the outer peripheral surface 25a of the drum 25. With this bottom plate 51, the liquid passage portion 21 through which the contaminated liquid passes is formed on the bottom side of the outer peripheral surface 25a of the drum 25. A filter outlet 52 is formed between a front end of the bottom plate 51 and the drum 25.

The squeeze roll 22 is formed of an elastic body, such as ebonite, and is pressed to the magnet drum 20 by, for example, a squeeze roll adjustment spring 54 (see FIG. 1). The squeeze roll 22 squeezes out a liquid contained in the sludge 81 adsorbed onto the outer peripheral surface 25a of the drum 25.

Next, the scraper 23 according to the present embodiment will be described in detail.

The scraper 23 is located in the nonmagnetic field region 42 formed on the upper portion 32 of the drum 25, and faces the outer peripheral surface 25a of the drum 25 outside the contaminated liquid D. The scraper 23 is a member for guiding the magnetic particles 81a adsorbed onto the outer peripheral surface 25a of the drum 25 to the outside of the separator main body 2 in the nonmagnetic field region 42.

Figure 3:
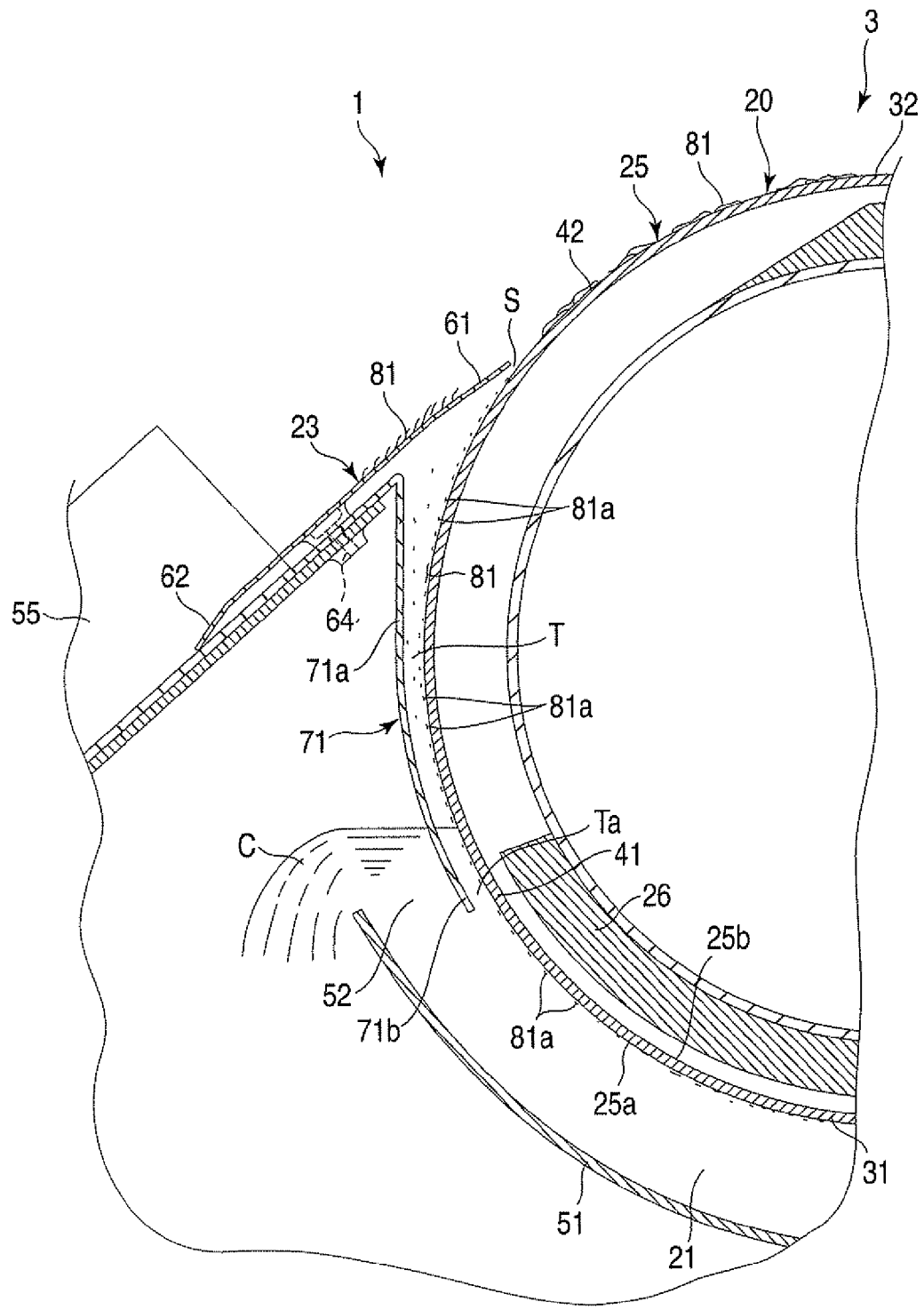
FIG. 3 is an enlarged cross-sectional view showing a vicinity of a scraper shown in FIG. 2.

As shown in FIG. 3, the scraper 23 extends from the nonmagnetic field region 42 to a sludge chute 55 described later. The scraper 23 comprises a front end portion 61 which faces the drum 25 and a rear end portion 62 which faces the sludge chute 55. As shown in FIGS. 1-3, the scraper 23 according to the present embodiment is slightly bent at the front end portion 61 and the rear end portion 62 with respect to a middle portion. The scraper 23 may not necessarily take the above-described shape, and may be a flat plate which does not have a bent portion or may have various bent portions or other forms.

As shown in FIG. 3, the scraper 23 extends, for example, in the direction of the tangential line of the outer peripheral surface 25a of the drum 25, and faces the drum 25 in a direction opposite to a rotation direction of the drum 25. As shown in FIG. 1, the front end portion 61 of the scraper 23 extends in an axial direction of the drum 25, and faces the outer peripheral surface 25a of the drum 25 along the axial direction. The phrase "face along the axial direction" means that the front end portion 61 of the scraper 23 extends in the axial direction, and each portion of the front end portion 61 extending in the axial direction faces the outer peripheral surface 25a of the drum 25. The scraper 23 has, for example, substantially the same width as the width of the drum 25.

As shown in FIG. 3, the front end portion 61 of the scraper 23 is isolated from the outer peripheral surface 25a of the drum 25, and faces the outer peripheral surface 25a of the drum 25 in a contactless manner. A small gap S (i.e., space) is formed between the front end portion 61 of the scraper 23 and the outer peripheral surface 25a of the drum 25. As mentioned above, the front end portion 61 of the scraper 23 faces the outer peripheral surface 25a of the drum 25 along the axial direction of the drum 25. The small gap S is formed between the entire portion, which extends in the axial direction, of the front end portion 61 of the scraper 23 and the outer peripheral surface 25a of the drum 25.

An example of the small gap S is a gap of 0.2 to 0.3 mm. The size of the small gap S may not necessarily be in the above range. When an oily coolant is processed, an oil film having a thickness of, for example, approximately 10 μm is formed on the outer peripheral surface 25a of the drum 25. The size of the small gap S may be any size larger than the thickness of the oil film. The size of the small gap S may be arbitrarily determined where necessary in accordance with the acceptable amount of, for example, the circularity of the drum 25, component tolerance of each component, or installation error.

As shown in FIGS. 1-3, the scraper 23 is fixed to the separator main body 2 by, for example, a screw 64. The scraper 23 is configured to form the small gap S between the front end portion 61 and the outer peripheral surface 25a of the drum 25 when, for example, the screw 64 is fully screwed. The attachment structure of the scraper 23 is not limited to screwing, and the scraper 23 may be attached by any method.

As shown in FIGS. 2 and 3, a guard plate 71 is provided below the scraper 23. The guard plate 71 is curved in the form of a circular arc along the outer peripheral surface 25a of the drum 25 below the scraper 23, and extends to a bottom portion 73 of the drum 25. A front end portion of the guard plate 71 enters the liquid passage portion 21 from the filter outlet 52, and extends to an area facing the magnetic field region 41 of the drum 25. Namely, the guard plate 71 comprises a first end portion 71a facing the nonmagnetic field region 42 of the drum 25 below the scraper 23, and a second end portion 71b facing the magnetic field region 41 of the drum 25 in the liquid passage portion 21.

A gap T is formed between the guard plate 71 and the outer peripheral surface 25a of the drum 25. A portion of gap T facing, for example, the magnetic field region 41 is a gap Ta influenced by the magnetic field of the magnet 26. An example of gap Ta influenced by the magnetic field of the magnet 26 is formed between the guard plate 71 and the magnetic field region 41 of the drum 25. The length of gap Ta is not particularly limited, and may be any length enough to allow sludge 81 which is not adsorbed by the magnet drum 20 in the nonmagnetic field region 42 any longer to be adsorbed again by the magnet drum 20.

Accordingly, the guard plate 71 guides the magnetic particles 81a which have entered the small gap S and detached from the drum 25 below the scraper 23 to the magnetic field region 41 in gap T. Namely, the guard plate 71 is a member for preventing the magnetic particles 81a which have detached from the drum 25 from being mixed into the coolant again.

As shown in FIGS. 1-4, the sludge chute 55 is adjacent to the scraper 23 from a side opposite to the magnet drum 20. The sludge chute 55 guides the magnetic particles 81a scraped off by the scraper 23 to a sludge box (not shown).

Next, a function of the separator 1 according to the present embodiment will be described.

As shown in FIG. 2, the contaminated liquid D first flows into the liquid storage part 11 of the separator main body 2. The contaminated liquid D flows between the magnet drum 20 and the bottom plate 51 under a guide of the bottom plate 51 (see black arrows in FIG. 2). During the process, the sludge 81 contained in the contaminated liquid D (i.e., magnetic particles 81a) is adsorbed onto the outer peripheral surface 25a of the drum 25 by the magnetic force of the magnet 26. The contaminated liquid D is thereby filtered to produce a cleaned liquid C from which the sludge 81 has been removed. The cleaned liquid C is discharged from the outlet 12 to the clean tank. The sludge 81 adsorbed onto the outer peripheral surface 25a of the drum 25 moves integrally with the outer peripheral surface 25a following rotation of the drum 25.

Figure 4:
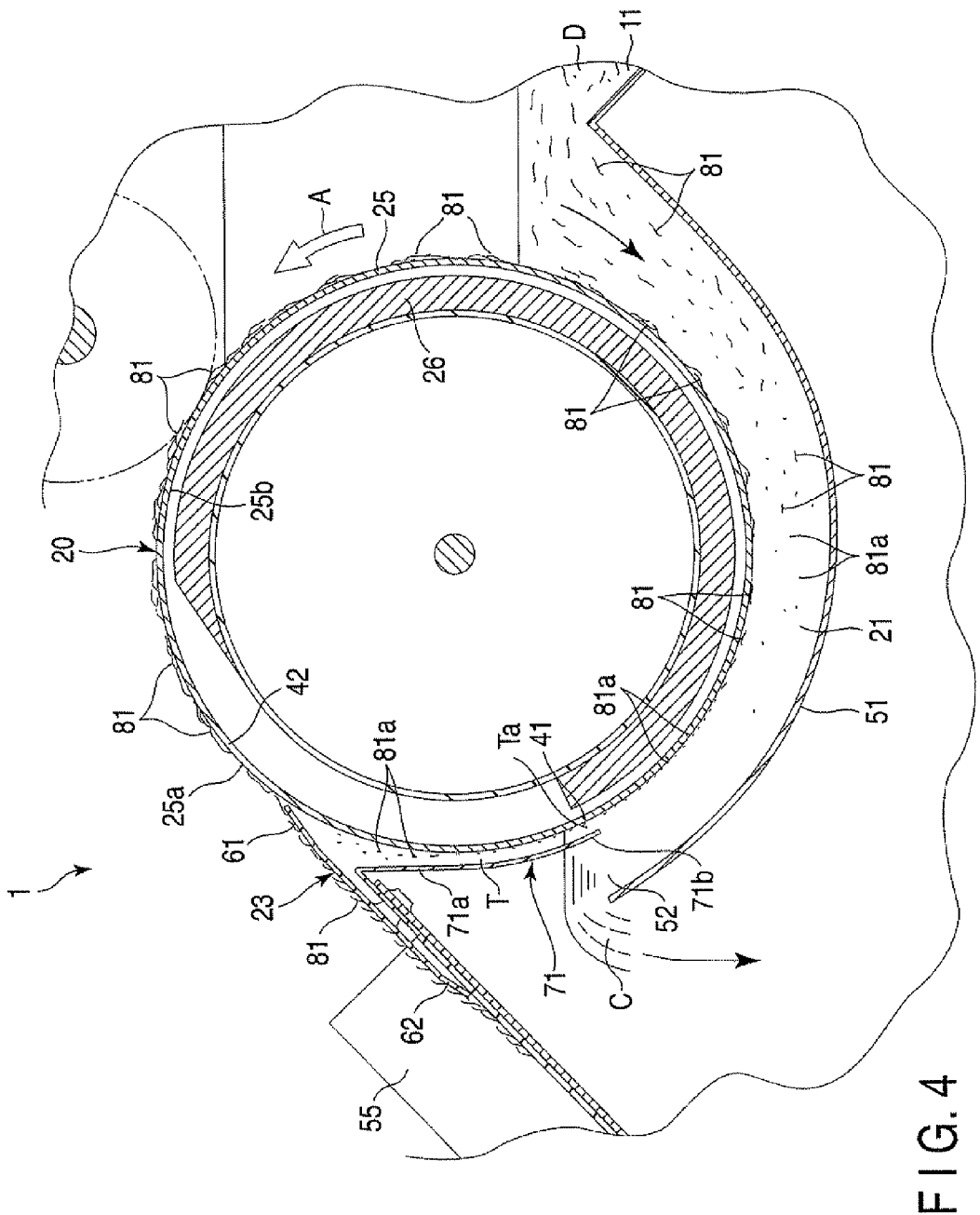
FIG. 4 is a schematic cross-sectional view showing a function of the separator shown in FIG. 1.

FIG. 4 schematically shows the function of the separator 1. As shown in FIG. 4, as the drum 25 rotates, the outer peripheral surface 25a of the drum 25 passes through the contaminated liquid D. While the outer peripheral surface 25a of the drum 25 is passing, magnetic particles 81a are adsorbed onto the outer peripheral surface 25a of the drum 25 one after another, and sludge 81 grows. Namely, while the outer peripheral surface 25a of the drum 25 is passing through the contaminated liquid D, the sludge 81 gradually form a large dump. The growth of the sludge 81 is realized by, for example, a plurality of magnetized magnetic particles 81a attracted to each other.

The sludge 81 adsorbed by the drum 25 moves upward as the drum 25 rotates, and the liquid in the sludge 81 is squeezed out by the squeeze roll 22. The squeezed-out liquid returns to the liquid storage part 11 again.

The sludge 81 that has passed the squeeze roll 22 enters the nonmagnetic field region 42 that is barely influenced by the magnet 26. At this time, the sludge 81 attached to the outer peripheral surface 25a of the drum 25 by the magnetic force of the magnet 26 is released from the magnetic force of the magnet 26. Accordingly, the sludge 81 comes to simply be placed on the outer peripheral surface 25a of the drum 25.

Each magnetic particle 81a constituting the sludge 81 is smaller than the small gap S between the front end portion 61 of the scraper 23 and the outer peripheral surface 25a of the drum 25. However, the sludge 81 into which the magnetic particles 81a have grown by gathering as described above has a size which enables the sludge 81 to be caught by the front end portion 61 of the scraper 23. In other words, the size of the gap S is adjusted so that the sludge 81 is caught by the front end portion 61. The sludge 81 which is simply placed on the outer peripheral surface 25a of the drum 25 is caught by the scraper 23 upon slight contact with the scraper 23, and stops moving.

As the drum 25 rotates, the following sludge 81 consecutively reaches the front end portion 61 of the scraper 23. When preceding sludge 81 is caught by the front end portion 61 of the scraper 23; the caught sludge 81 is pushed up on the scraper 23 by sludge 81 which arrives later, or sludge 81 which arrives later runs on the preceding caught sludge 81, and consequently runs on the scraper 23.

In this manner, the sludge 81 is scraped off by the scraper 23. The sludge 81 scraped off by the scraper 23 is guided by the sludge chute 55, and discharged to the sludge box. The term "scrape" in this specification does not mean scraping the outer peripheral surface 25a of the drum 25, but means scraping off the sludge 81 as described above, i.e., catching and removing the sludge 81.

For example, when an oily coolant is processed, an oil film is formed on the outer peripheral surface 25a of the drum 25. The oil film has, for example, a thickness of, for example, approximately 10 µm, and is attached to the outer peripheral surface 25a of the drum 25 by its own surface tension. Such an oil film passes though the small gap S between the front end portion 61 of the scraper 23 and the outer peripheral surface 25a of the drum 25, and returns into the separator main body 2 without being scraped off by the scraper 23.

Since each of the magnetic particles 81a constituting the sludge 81 is smaller than the small gap S between the front end portion 61 of the scraper 23 and the outer peripheral surface 25a of the drum 25, some of the magnetic particles 81a enter the small gap S without being scraped off by the scraper 23. Since the scraper 23 is located in the nonmagnetic field region 42, some of the particles 81a simply placed on the outer peripheral surface 25a of the drum 25 detach from the outer peripheral surface 25a of the drum 25 after passing through the small gap S.

The magnetic particles 81a which have detached from the outer peripheral surface 25a of the drum 25 are guided by the guard plate 71 to the gap T between the guard plate 71 and the drum 25. The magnetic particles 81a guided to the gap T are adsorbed again by the magnetic field region 41 of the outer peripheral surface 25a of the drum 25 in gap Ta influenced by the magnetic power of the magnet 26, and move integrally with the outer peripheral surface 25a of the drum 25. Accordingly, the magnetic particles 81a are not mixed to the filtered coolant.

The magnetic particles 81a adsorbed again by the drum 25 join the magnetic particles 81a contained in the contaminated liquid D and grow into sludge 81 while the outer peripheral surface 25a of the drum 25 is exposed again to the contaminated liquid D. The sludge 81 grown to have a size which enables the sludge 81 to be caught by the scraper 23 is scraped off by the scraper 23 when the sludge 81 is guided upward following rotation of the drum 25. This cycle is also applicable to the case where the sludge 81 enters the small gap S between the scraper 23 and the drum 25.

The separator 1 having such a configuration can suppress loss of a liquid to be processed (for example, loss of oil). Namely, in the separator 1 according to the present embodiment, the front end portion 61 of the scraper 23 faces the outer peripheral surface 25a of the drum 25 in a contactless manner, and the small gap S is formed between the front end portion 61 and the outer peripheral surface 25a of the drum 25. The separator 1 having such a configuration can substantially prevent an oil film formed on the outer peripheral surface 25a of the drum 25 from being scraped off and can suppress loss of oil.

On the other hand, even though the small gap S is formed between the front end portion 61 and the outer peripheral surface 25a of the drum 25, the sludge 81 can be sufficiently removed by use of the phenomenon in which the sludge 81 grows. The inherent function of the scraper 23 can be thereby sufficiently secured.

Furthermore, since the front end portion 61 of the scraper 23 does not contact the outer peripheral surface 25a of the drum 25, the following advantages are produced:

(1) loss of the liquid to be processed is reduced;
(2) the outer peripheral surface 25a of the drum 25 is less damaged; and
(3) the scraper 23 is less worn.

If the front end portion 61 of the scraper 23 comes into intimate contact with the outer peripheral surface 25a of the drum 25, wearing-off based on a friction between the scraper 23 and the drum 25 is caused. In particular, when a coolant used for grinding machining is filtered, the coolant may contain not only magnetic particles 81a, but also nonmetal or nonmagnetic metal such as a minute abrasive grain which has detached from a grindstone. The abrasive grain may be stuck between the front end portion 61 of the scraper 23 and the outer peripheral surface 25a of the drum 25, and both the scraper 23 and drum 25 may be worn off or damaged.

If the scraper 23 is worn off or damaged, the sludge 81 may not be effectively scraped off. If the outer peripheral surface 25a of the drum 25 is worn off or damaged, the squeeze efficiency of the squeeze roll 22 is reduced, with the result that loss of the liquid to be processed is increased.

Since the scrapper 23 faces the drum 25 in the contactless manner in the present embodiment, the possibility of causing the above problem is reduced. Namely, the use of the scraper 23 according to the present embodiment supresses loss of the liquid to be processed without mechanical upgrading, such as hardening the surface of the magnetic drum, hardening the rubber of the squeeze roll, or hardening the squeeze roll adjustment spring.

Since the separator 1 comprises the guard plate 71 which extends from below the scraper 23 along the outer peripheral surface 25a of the drum 25 to the bottom portion of the drum 25 and further extends into the liquid passage portion 21, and gap Ta influenced by the magnetic field of the magnet 26 is formed between the guard plate 71 and the outer peripheral surface 25a of the drum 25, the magnetic particles 81a which have detached from the drum 25 below the scraper 23 can be guided by the guard plate 71 to the magnetic field region 41 of the drum 25 in gap T, and the magnetic particles 81a are prevented from being mixed into the filtered coolant.

In particular, since the coolant in the liquid passage portion 21 flows in a direction departing from the drum 25 in an area below the scraper 23 in the present embodiment, the magnetic particles 81a which have detached from the outer peripheral surface 25a of the drum 25 may flow in the direction departing from the drum 25 if the guard plate 71 is not provided. With the guard plate 71, the magnetic particles 81a do not follow the above-described flow of the coolant, and can be guided to the magnetic field region 41 of the drum 25.

The magnet separator according to one embodiment of the present invention has been described so far, but the present invention is not limited to this embodiment.

The magnet separator of the present invention can purify various coolants. The magnet separator according to the present invention can also be used for filtering a water-soluble coolant. It is to be understood, in carrying out the present invention, that the components of the magnet separator, such as the scraper, drum and magnet, may be embodied in suitably modified forms without departing from the spirit of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic separator, comprising:
    a separator main body comprising a liquid storage part which stores a liquid to be processed containing magnetic particles; and
    a magnetic drum mechanism provided in the separator main body, wherein the magnetic drum mechanism comprises:
    a cylindrical drum which rotates around a horizontal axis and comprises an upper portion above a surface of the liquid;
    a magnet provided inside of the drum, facing an inner peripheral surface of the drum, and fixed to the separator main body in such a manner that the magnet is stationary when the drum is rotating, the magnet forming a magnetic field region configured to adsorb the magnetic particles in a circumferentially partial range of an outer peripheral surface of the drum;
    a liquid passage portion which is formed on a bottom side of the outer peripheral surface of the drum and through which the liquid passes; and
    a scraper provided in a nonmagnetic field region formed on the upper portion of the drum at a position separated from the magnetic field region in the circumferential direction, the scraper being configured to guide the magnetic particles adsorbed onto the outer peripheral surface of the drum to an outside of the separator main body in the nonmagnetic field region, and
    the scraper comprises a front end portion which faces the outer peripheral surface of the drum in a contactless manner along an axial direction of the drum, and a small gap is formed between the front end portion and the outer peripheral surface of the drum.

2. The magnet separator of claim 1, further comprising a guard plate which extends from below the scraper along the outer peripheral surface of the drum to a bottom portion of the drum and extends into the liquid passage portion, wherein a gap influenced by a magnetic field of the magnet is formed between the guard plate and the outer peripheral surface of the drum, and the guard plate is configured to guide magnetic particles detached from the drum below the scraper to the magnetic field region in the gap.

* * * * *